United States Patent Office 3,353,930
Patented Nov. 21, 1967

3,353,930
PROCESS FOR THE PRODUCTION OF
SOLUBLE COMPOUNDS
Hermann Clasen, Falkenstein, Taunus, Jürgen Müller, Langelsheim, Harz, and Rudolf Joppen, Frankfurt am Main, Germany, assignors to Metallgesellschaft Aktiengesellschaft, Frankfurt am Main, Germany
No Drawing. Filed Oct. 3, 1961, Ser. No. 142,506
Claims priority, application Germany, Oct. 19, 1960, M 46,885
1 Claim. (Cl. 23—365)

The present invention relates to an improved process for the production of solutions of compounds in solvents in which the materials for producing such compounds are insoluble or for carrying out reactions between solid reactants in solvents in which all of the reactants are substantially insoluble.

In the preparation of chemical compounds there often is the desire to form such compounds in a solvent suited for such compounds from which they may later be completely separated. Often, however, this has not been possible, as the solvent meeting these requirements does not dissolve the reactants and such reactants are solids and therefore normally will not react with each other under such conditions. For example, it would be desirable to produce lithium aluminum hydride in diethyl ether as the hydride formed can be separated quantitatively from the ether without difficulty. However, the known reaction between sodium aluminum hydride and lithium chloride has not been possible in diethyl ether because of the insolubility of the reactants therein, even though this reaction proceeds smoothly to completion in tetrahydrofurane. In such instance, however, the lithium aluminum hydride formed cannot be cleanly separated from the tetrahydrofurane because tetrahydrofuranates remain which cannot be decomposed without cleavage of hydride hydrogen.

It is an object of the invention to overcome these disadvantages.

The process according to the invention concerns the production of solutions of a compound in a solvent medium from solid starting materials which substantially do not dissolve in such solvent and therefore normally are normally unreactive with respect to each other. According to the invention it was unexpectedly found that the reaction between the solid insoluble reactants in the solvent medium could be engendered by grinding such reactants together so that a solution of the product compound is obtained directly in such solvent medium. While it is known that solids which are to react with liquids can be activated by grinding it was completely unexpected that a reaction between solid substances can be carried out in a solvent medium which dissolves the product of such reaction but not the reactants. The process according to the invention is generally applicable to all substance systems provided, of course, that the reaction concerned is thermodynamically possible. The individual requirements for the reaction as to temperature, pressures and the like, as well as other measures, such as exclusion of moisture or air, also are dependent upon the individual reactions involved. Also, of course, if the product formed must be separated completely from the solvent in which it is formed, this faction must also be taken into consideration in the selection of the solvent medium.

Essentially all types of grinding apparatus are suited for grinding the starting materials employed according to the invention but preferably ball or rod mills are employed. Rocking mills or mills in which the reaction mass contains grinding bodies distributed therein which are kept in motion by stirring arms are especally suited. Of course, in the selection of the mill care must be taken that it is not attacked by the reactants, the solvent or the product or that it unfavorably influences the reaction. Most suited are mills which provide for the quickest possible grinding of the solid particles to as fine a degree as possible in order to increase the velocity of the progress of the reaction as much as possible. When an increase in temperature of the reaction liquid is required for the progress of the reaction, it is expedient to employ a rocking mill or a mill such as indicated above in which the reaction mass contains grinding bodies distributed therein which are kept in movement by stirring arms (a so-called attrition mill, Ger. Attritor Mühle).

The process according to the invention is especially adapted for the production of double hydrides which are soluble in an ether by conversion of another double hydride and a corresponding salt which are not soluble in such ether. While previously, for example, it was only possible to produce lithium aluminum hydride from sodium aluminum hydride in tetrahydrofurane, the process according to the invention renders it possible to use diethyl ether in which the starting materials, namely, sodium aluminum hydride and lithium chloride are insoluble. The process according to the invention for the first time renders it possible to produce pure lithium aluminum hydride which is completely solvent free by double decomposition from sodium aluminum hydride and lithium chloride. Previously it was only possible to produce pure lithium aluminum hydride by the substantially more costly method employing lithium hydride and aluminum chloride as starting materials in diethyl ether. Other double aluminum hydrides besides sodium aluminum hydride can be employed in the process according to the invention for the production of lithium aluminum hydride, such as, for example, calcium aluminum hydride.

A further example of the application of the process according to the invention is the reaction of lithium sulfate and calcium chloride to form calcium sulfate and lithium chloride in tetrahydrofurane in which the desired product lithium chloride dissolves. The dissolved lithium chloride can be easily separated from the tetrahydrofurane.

The following examples will serve to illustrate several embodiments of the invention:

*Example 1*

8 g. of melted lithium chloride were introduced into an iron vessel of a rocking mill which was ¾ full of steel balls. After the melt had cooled down, 10 g. of sodium aluminum hydride and 410 cc. of diethyl ether were added. The vessel thereupon was ⅘ full. The rocking mill was then placed into operation. After 3 hours 50 cc. of the resultant suspension were drawn off and centrifuged. Water was added to 10 cc. of the resulting clear solution whereupon strong hydrogen evolution occurred. The lithium content of the solution amounted to 23.4 mg. which corresponded to a 75% conversion. After 5 hours' milling, the conversion amounted to 94.5% and after 7 hours' 100%.

In contrast, when 2 g. of powdered sodium aluminum hydride and 2 g. of finely divided lithium chloride were refluxed in 100 cc. of diethyl ether for 5 hours, the supernatant clear solution obtained after cooling did not evolve any hydrogen upon addition of water. Lithium was not detectable therein which would indicate that lithium chloride and sodium aluminum hydride do not normally react in diethyl ether.

*Example 2*

3 g. of lithium chloride, 3 g. of $NaAlH_4$ and 100 cc. of absolute diethyl ether were introduced into a mill which has rotating horizontal means going through balls and which is sold under the trademark "Attritor" and ground for 1 hour. An active solution was obtained upon centrifuging the resulting suspension. 50 cc. of the solution contained 164 mg. of Li which indicated a conversion of about 85%.

*Example 3*

3 g. of lithium chloride, 3 g. of $NaAlH_4$ and 100 cc. of absolute diethyl ether were introduced into an Attritor-mill and ground for 1 hour while boiling the mixture under reflux. 50 cc. of the clear centrifuged solution contained 193 g. of Li (about 100% yield). Solid $LiAlH_4$ can be recovered from the solution in a known manner by pumping off the diethyl ether at raised temperatures.

*Example 4*

3.8 g. of $NaBH_4$, 4.3 g. of LiCl and 120 cc. of absolute diethyl ether were ground in an attrition mill provided with glass balls for 3 hours. The yield of $LiBH_4$ was 30%.

We claim:

A process for producing lithium aluminum hydride which consists in grinding together sodium aluminum hydride and lithium chloride in diethyl ether.

References Cited

UNITED STATES PATENTS

| | | | |
|---|---|---|---|
| 3,113,832 | 12/1963 | Kollonitsch et al. | 23—361 |
| 3,162,508 | 12/1964 | Bragdon et al. | 23—365 |
| 3,180,700 | 4/1965 | Robinson | 23—365 |

FOREIGN PATENTS

| | | |
|---|---|---|
| 223,475 | 8/1959 | Australia. |
| 795,130 | 5/1958 | Great Britain. |

OTHER REFERENCES

Clasen: "Angewandte Chemie," vol. 73, pp. 322–331 (1961).

MILTON WEISSMAN, *Primary Examiner.*

MAURICE A. BRINDISI, *Assistant Examiner.*